Nov. 26, 1935.    A. B. WELTY    2,022,166
TANK UNLOADER FOR HARVESTERS
Filed March 19, 1934    3 Sheets-Sheet 1
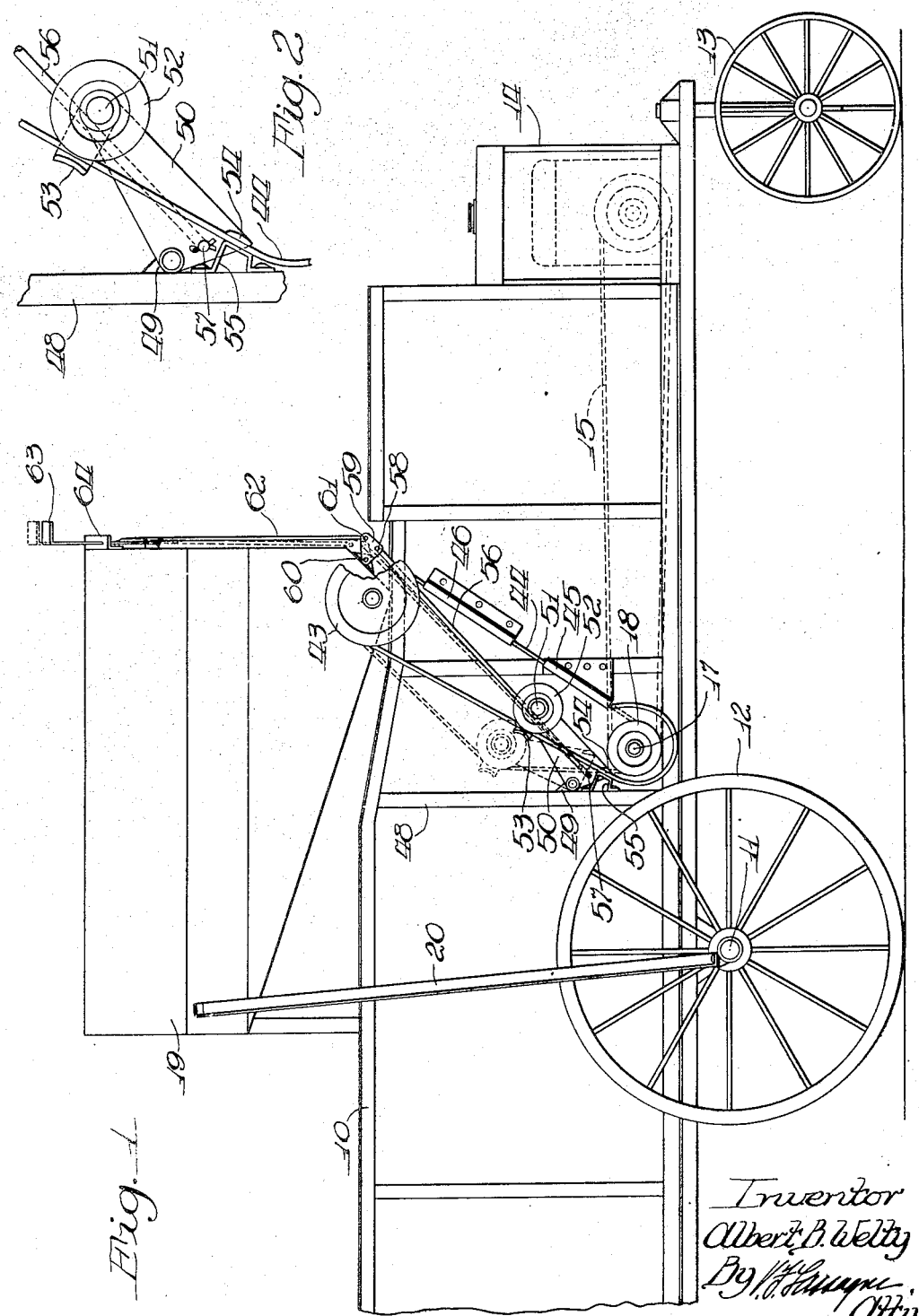
Inventor
Albert B. Welty

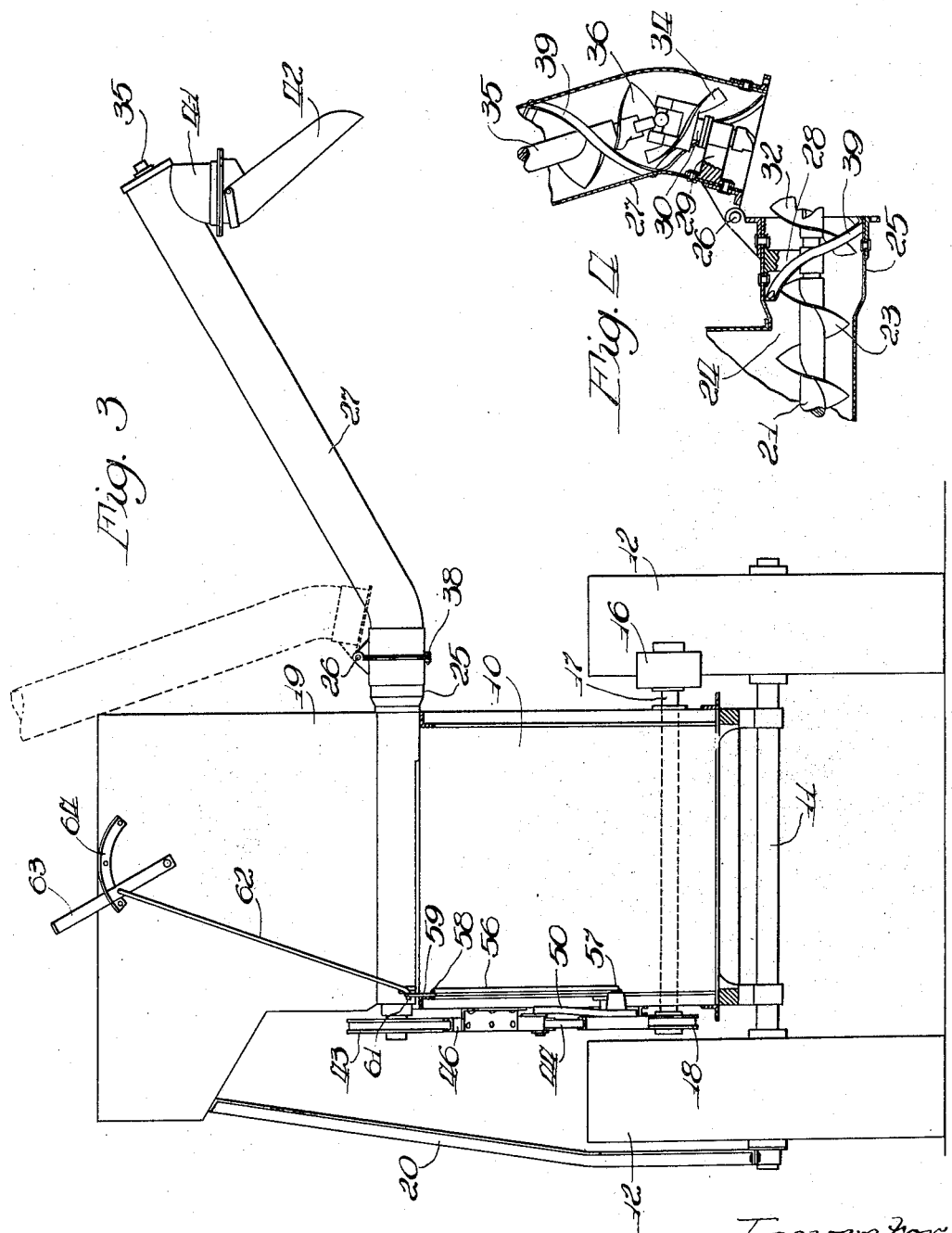

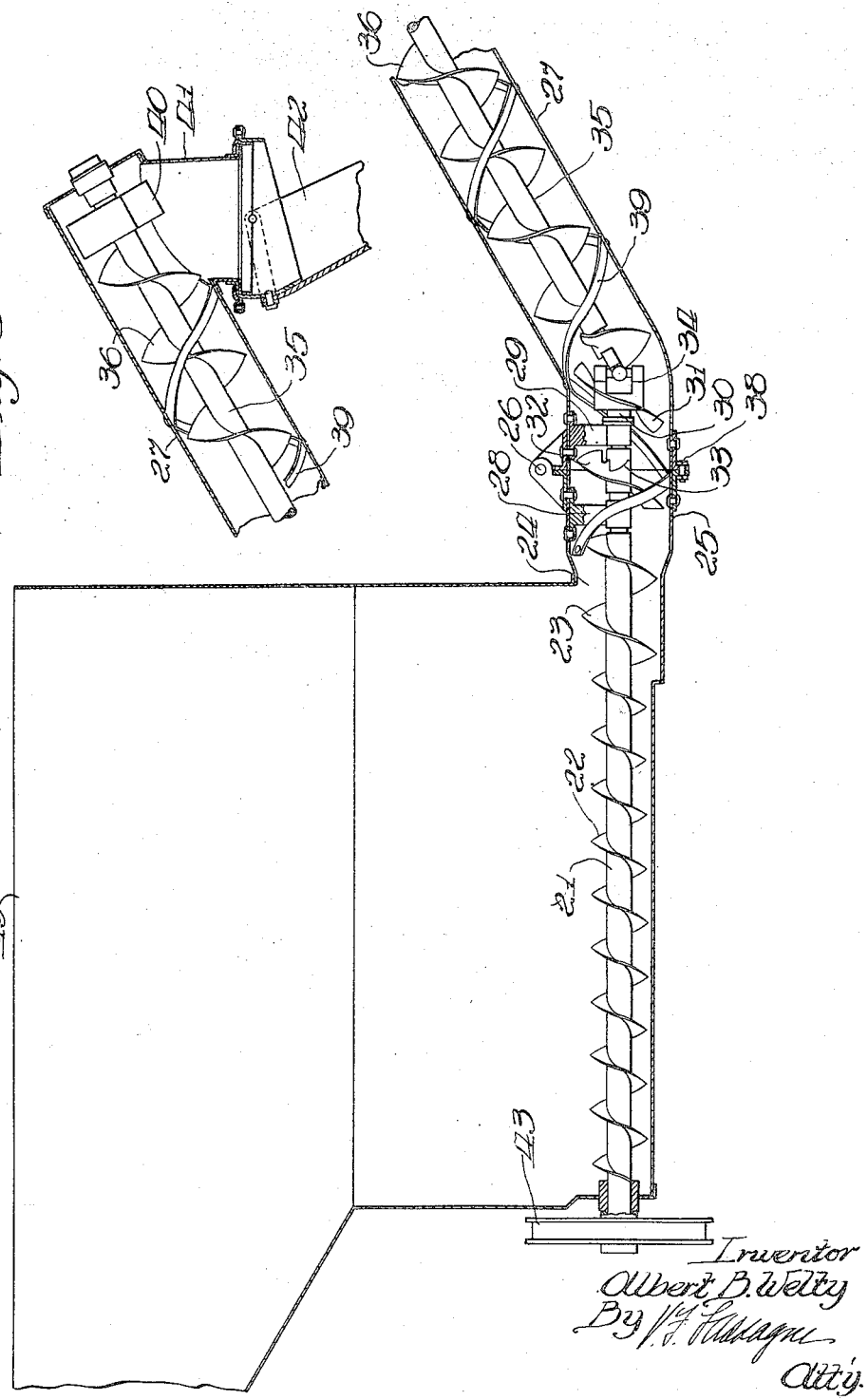

Patented Nov. 26, 1935

2,022,166

UNITED STATES PATENT OFFICE 2,022,166

TANK UNLOADER FOR HARVESTERS

Albert B. Welty, Moline, Ill., assignor to International Harvester Company, a corporation of New Jersey Application March 19, 1934, Serial No. 716,313

4 Claims. (Cl. 198—64)

The invention relates to a power unloader for storage tanks or bins now commonly employed on harvesters to accumulate a predetermined amount of the harvester crop while the harvesting machine that carries such tank or bin is working and moving through the field being harvested.

More particularly, the invention relates to a power unloader for the grain tank employed in harvester threshers.

The objects of the invention are to provide an improved unloader for grain tanks of the type specified; to provide an improved type of crop handling mechanism combined with the tank in such a manner as to be choke or clog proof; to provide a foldable discharge elevator as part of the unloader; to provide an improved drive for the unloader; and, lastly, generally to improve and simplify the structure and operation of such unloaders.

These objects may be achieved by the illustrative example of the invention herein to be disclosed in which a harvester thresher carries a tank in the form of a hopper, in the bottom of which is disposed a transversely arranged feed screw or auger of particular construction, said screw passing laterally out of the lower end of the tank and into an outwardly and upwardly extending elevator having a discharge spout for directing the unloaded material into a wagon, or similar vehicle, standing adjacent the harvester thresher. The elevator spout is hinged to permit the same to be conveniently folded alongside the tank, so that the elevator will not constitute an impediment when moving the harvester thresher through narrow gateways and the like, and to get it out of the way while the harvesting operation is under way. The feed auger or screw is also hinged within the elevator. A simple form of drive is provided to enable the operator to connect and disconnect the unloader to a source of power on the harvester thresher as desired.

In the accompanying sheets of drawings illustrating an example of the invention, Figure 1 is a side elevation of a harvester thresher showing the tank thereon and the drive mechanism for the unloader;

Figure 2 is an enlarged detail face view of a portion of the drive mechanism shown in Figure 1;

Figure 3 is a front elevational view of the harvester thresher and tank, the unloading elevator being shown in its folded position in the dotted lines;

Figure 4 is an enlarged detail sectional view through the elevator and feed screw to show its hinge structure; and, Figure 5 is a transverse cross-sectional view, looking from the front, of the tank and unloader detached from the harvester thresher, the discharge end of the elevator being broken off and set in on the sheet because of lack of space.

The harvester thresher, partly shown, is of the usual type having a thresher part 10 carried on an axle 11, wheels 12, and a steering front wheel truck 13. The front end of the thresher part carries a transversely disposed motor 14 that drives a belt 15, in turn operating a pulley 16 on the thresher cylinder shaft 17 arranged transversely through the thresher, said shaft at its stubbleward end carrying a pulley 18.

The hopper, or tank 19, is appropriately mounted on top of the thresher and suitably braced by a brace 20, for example. As shown in Figures 1 and 5, the tank is open at its top and is adapted to receive grain, or the like from an elevator from the thresher, not shown, while the machine is traveling through a field and harvesting. Said tank has a floor or bottom which slopes from the rear downwardly toward the front wall of the tank, said low point of the tank locating a transverse shaft 21 formed with an auger or screw spiral 22, whose depth of spiral is relatively small and uniform across the bottom of the tank, but abruptly enlarging in the depth of spiral adjacent the discharge point of the tank, as shown at 23, for a purpose later to appear. The hopper or tank has a discharge opening 24, from which leads a pipe 25 made fast to the stubbleward wall of the tank. There is no slide or gate in this opening. Said pipe 25 is of short length and has hingedly connected thereto by a hinge 26, an outward and upwardly extending discharge elevator pipe 27. The auger feed screw 23 extends into the pipe 25 where the end of the shaft 21 is supported in a bearing and hanger 28. The horizontal short portion of the elevator pipe 27 similarly carries a bearing hanger 29 for a short shaft 30, which carries a spiral flight 31 while the extension of the shaft 21 stubblewardly beyond the hanger 28 also carries a single spiral flight 32. The two shafts 21 and 30 have their adjacent ends formed with complementary clutch portions to form a clutch 33. The stubbleward end of the shaft 30 is connected by a universal joint 34 to an upwardly inclined shaft 35 carried in the elevator 27, said shaft carrying an auger feed screw 36, as shown. The universal joint just mentioned carries an auger flight portion as shown. The pipe sections 25, 27 are rigidly jointed together in normal operation of the unloader by means of a bolt latch 38 for connecting the pipes into a continuous whole with the hinge 26 normally inoperative. It is of interest to note that the clutch 33 is coincident with the hinge in the elevator and that the universal joint is located at the upward bend in the elevator pipe 27. A low spiral wall 39 is secured around the inside of the elevator pipe to prevent the material being elevated from back-sliding.

This discharge end of the shaft 35 carries a paddle 40 to direct the material to a down turned end 41 of the elevator, to which is connected an adjustable spout 42 to direct the grain into a wagon standing therebeneath and along side the harvester thresher. The slope of the spout 42 can be adjusted in the usual way.

The grainward end of the shaft 21 extends outwardly of the tank to carry a pulley 43. A belt 44 is trained around the pulley 43 and the pulley 18. The belt 44 is guided in guides 45 and 46 fastened to the thresher side, as shown in Figure 1. These guides are so disposed that all belt slack is caused to run down below and under the drive pulley 18, as shown in the full lines in Figure 1. By tightening the belt the drive between the pulleys 18 and 43 is established. Accordingly, an upright frame piece 48 of the thresher part 10 carries a pin 49 for pivotally mounting a bracket 50, as shown in Figure 2, said bracket being triangular with its pivot at one angle thereof. The upper angle of the triangular bracket carries a shaft 51 for mounting a pulley wheel 52, the pulley having a guide block 53. The belt 44 is passed between the pulley 52 and guide block 53. The lower angle of the bracket 50 is formed with a guide shoe 54, and the frame piece 48 carries a bracket 55 in a position below the pivot 49, so that the belt 44 may at the proper time be clamped against the bracket 55 by the shoe 54, as shown in Figure 2. The bracket 50 is swung about its pivot 49 by a push-pull rod 56 pivotally connected at 57 to the bracket between the pivot 49 and shoe 54; in other words, below the pivot 49. The rod 56 extends upwardly and is pivotally connected, as shown in Figure 1, to the lower angle 58 of a small triangular plate 59 pivoted at 60 to the hopper or tank near its bottom and exteriorly thereof. The remaining corner 61 of said plate 59 pivotally receives a vertical rod 62 pivotally connected at its upper end to a lever 63 pivotally mounted on the front wall of the tank, as shown in Figure 3, where it is readily accessible to the operator on his station usually located forwardly of the tank and not herein shown. The lever 63 is an over-dead-center type guided by a quadrant 64, as shown.

In use, the threshed grain is conveyed by an elevator, not shown, from the thresher 10 upwardly into the tank where the harvested crop is stored while the harvesting proceeds. In the meanwhile the elevator 27 is folded up alongside the tank, as shown in dotted lines in Figure 3 and the lever 63 is moved to that side of its dead center where the linkage 62, 56 will hold the bracket 50 and pulley 52 in the position shown in full lines in Figure 1. This causes slack in the belt 44, the slack portion of the belt being guided downwardly by the guides 45, 46 and the shoe 54 below the drive pulley 18. Thus, as the grain accumulates in the tank, the belt 44 is slack and the screw 22 is not driven; further, as stated, the elevator 27 is folded.

When the tank 19 has accumulated a full load, the harvester thresher is brought to a stand still and a wagon, or the like, is drawn up alongside the stubbleward side of the harvester thresher in a position to be under the spout 42 when the elevator 27 is unfolded, as shown in full lines in Figure 3. Unfolding the elevator couples the clutch 32 in an obvious manner and by bolting the latch 38 all elevator parts are held in their operative positions. Next, the lever 63 is swung over dead center to its other position, which causes the belt 44 to be tightened around the drive pulley 18, which is rotating all the while from the shaft 17, as heretofore described. Consequently, the pulley 43 is driven, which, of course, drives the screw conveyer 22, its shaft 21, through the clutch driving shaft section 30, and its flight 31. The shaft 30, through the joint 34 carrying a portion of the spiral feed, in turn drives the screw conveyer 36. Thus, the grain is taken from the bottom portion of the tank and elevated to the spout 42, which directs the grain to the wagon mentioned. The whole unloading operation is speedily initiated as there is no door, or slide, that must first be opened to get the grain out of the tank. The belt and pulley drive has the advantage of permitting slippage while the unloading mechanism gets up speed. Thus, nothing can break. The shallow depth screw flights 22 also aid in this connection by preventing clogging or choking. The shallow depth flights 22, being under the dead load of grain piled thereon, start moving easily and, as the grain moved thereby towards the outlet 24 builds up, the relatively greater depth of flights 23 comes into play more quickly to move the material out of the tank.

From this disclosure it can now be seen that an improved tank unloader for harvesters has been provided, which achieves all of the desirable objects heretofore recited.

It is the intention to cover all changes and modifications not departing from the spirit and scope of the invention as witnessed by the appended claims.

What is claimed is:

1. In combination, a tank, a screw conveyer located along the bottom of the tank, said tank having a discharge outlet to which the screw conveyer feeds, an elevator pipe connected to the tank and in communication with said outlet, said elevator pipe having a horizontal portion and an upwardly inclined portion, a hinge for foldingly connecting the two portions whereby the upwardly inclined portion may be folded upwardly against the tank, a latch for normally making the hinge ineffective and to hold the upwardly inclined portion in normal position, a screw conveyer in the elevator, a separable clutch element for operatively and coaxially connecting adjacent ends of the conveyers, said clutch element being adjacent said hinge, and means to drive the conveyers.

2. The combination with a tank, of an unloading device for the tank comprising a screw conveyer located at the bottom of the tank, means to drive said conveyer, a horizontal pipe carried by the tank into which the screw conveyer feeds, an upwardly inclined elevator hingedly connected to the pipe for folding movement upwardly alongside the tank, a screw conveyer in the elevator flexibly connected with the first conveyer to be driven thereby, and a clutch between the two conveyers.

3. In combination, a tank, a screw conveyer located along the bottom of the tank, said tank having a discharge outlet to which the screw conveyer feeds, an elevator pipe connected to the tank and in communication with said outlet, said elevator pipe having a horizontal portion and an upwardly inclined portion, a hinge for foldingly connecting the two portions whereby the upwardly inclined portion may be folded upwardly against the tank, a latch for normally making the hinge ineffective and to hold the upwardly inclined portion in normal position, a screw conveyer in the elevator, a separable clutch element for operatively and co-axially connecting adjacent ends of the conveyers, said clutch element being adjacent said hinge, and means comprising a pulley and belt drive connection for driving the screw conveyers, said means including a belt tightener manually operable to engage the belt with the pulleys or to disengage the belt from the pulleys.

4. The combination with a tank, of an unloading device for the tank comprising a screw conveyer located at the bottom of the tank, means to drive said conveyer, a horizontal pipe carried by the tank into which the screw conveyer feeds, an upwardly inclined elevator hingedly connected to the pipe for folding movement upwardly alongside the tank, a screw conveyer in the elevator flexibly connected with the first conveyer to be driven thereby, a clutch between the two conveyers, and means comprising a pulley and belt drive connection for driving the screw conveyers, said means including a manually movable belt tightener to engage or disengage the belt with respect to the pulleys.

ALBERT B. WELTY.